(12) United States Patent  
Ueda

(10) Patent No.: US 8,785,030 B2  
(45) Date of Patent: Jul. 22, 2014

(54) FLEXIBLE BATTERY AND METHOD FOR PRODUCING THE SAME

(75) Inventor: Tomohiro Ueda, Osaka (JP)

(73) Assignee: Panasonic Corporation, Osaka (JP)

( * ) Notice: Subject to any disclaimer, the term of this patent is extended or adjusted under 35 U.S.C. 154(b) by 83 days.

(21) Appl. No.: 13/805,768

(22) PCT Filed: Dec. 16, 2011

(86) PCT No.: PCT/JP2011/007052  
§ 371 (c)(1),  
(2), (4) Date: Dec. 20, 2012

(87) PCT Pub. No.: WO2012/140709  
PCT Pub. Date: Oct. 18, 2012

(65) Prior Publication Data  
US 2013/0101884 A1    Apr. 25, 2013

(30) Foreign Application Priority Data  
Apr. 11, 2011  (JP) ................. 2011-087036

(51) Int. Cl.  
*H01M 6/00* (2006.01)  
*H01M 10/0583* (2010.01)  
*H01M 10/04* (2006.01)  
*H01M 10/052* (2010.01)  
*H01M 2/02* (2006.01)  
*H01M 10/058* (2010.01)

(52) U.S. Cl.  
CPC .............. *H01M 2/02* (2013.01); *H01M 2/0285* (2013.01); *H01M 2/026* (2013.01); *H01M 10/0583* (2013.01); *Y02E 60/122* (2013.01); *H01M 2/0287* (2013.01); *H01M 10/0436* (2013.01); *H01M 2/021* (2013.01); *H01M 2/0275* (2013.01); *H01M 2/0277* (2013.01); *H01M 10/058* (2013.01); *H01M 10/052* (2013.01)

USPC ............................... 429/127; 429/163

(58) Field of Classification Search  
USPC .................................... 429/127, 163  
See application file for complete search history.

(56) References Cited

U.S. PATENT DOCUMENTS 5,057,384 A    10/1991  Bones et al.  
6,498,929 B1   12/2002  Tsurumi et al.  
(Continued)

FOREIGN PATENT DOCUMENTS

JP    03-068358    7/1991  
JP    03-187161    8/1991  
(Continued)

OTHER PUBLICATIONS

International Search Report for PCT/JP2011/007502 dated Feb. 7, 2012.

*Primary Examiner* — Stewart Fraser  
(74) *Attorney, Agent, or Firm* — McDermott Will & Emery LLP

(57) ABSTRACT

Disclosed is a flexible battery including a sheet-like electrode group, an electrolyte, and a housing with flexibility enclosing the electrode group and electrolyte. The housing includes a film material folded into two in which the electrode group is inserted. The film material has two facing portions respectively facing two principal surfaces of the electrode group, a fold line which is between the two facing portions and along which the film material is folded, and two bonding margins respectively set around the two facing portions. The two bonding margins are bonded to each other into a bonded portion. At least the two facing portions of the film material are formed in a corrugated shape having a plurality of ridge and valley lines arranged in parallel to each other. The ridge lines in one of the two facing portions are overlapped with the valley lines in the other. The fold line is parallel to the ridge and valley lines.

11 Claims, 13 Drawing Sheets

(56) References Cited

U.S. PATENT DOCUMENTS

| | | | |
|---|---|---|---|
| 6,632,538 B1 * | 10/2003 | Yamazaki et al. | 428/461 |
| 2005/0147192 A1 | 7/2005 | Yamamoto et al. | |
| 2006/0132346 A1 | 6/2006 | Tryggvason et al. | |
| 2007/0140381 A1 | 6/2007 | Suemitsu et al. | |
| 2008/0138702 A1 | 6/2008 | Nakamura et al. | |
| 2011/0091764 A1 * | 4/2011 | Kim | 429/163 |

FOREIGN PATENT DOCUMENTS

| | | |
|---|---|---|
| JP | 07-006771 | 10/1995 |
| JP | H11-345599 | 12/1999 |
| JP | 2000-173559 | 6/2000 |
| JP | 2008-071732 | 3/2008 |
| JP | 2010-199035 | 9/2010 |

\* cited by examiner

FLEXIBLE BATTERY AND METHOD FOR PRODUCING THE SAME

RELATED APPLICATIONS

This application is the U.S. National Phase under 35 U.S.C. §371 of International Application No. PCT/JP2011/007052, filed on Dec. 16, 2011, which in turn claims the benefit of Japanese Application No. 2011-087036, filed on Apr. 11, 2011, the disclosures of which Applications are incorporated by reference herein.

TECHNICAL FIELD

The present invention relates to a flexible battery including a housing made of a film-like material, and a method for producing the same.

BACKGROUND ART

The recent spread of portable electronic devices with compact design such as cellular phones and hearing aids is remarkable.

Devices that operate in contact with the skin of a living body also get more varied and spread. For example, a vital sign remote monitoring device that measures or monitors vital signs, such as body temperature, blood pressure, and pulse, and automatically transmits the obtained information to a hospital and the like has been developed. A patch-type medicine supplying device that, upon the application of a potential, supplies medicine through the skin has also been developed.

Under these circumstances, the batteries for supplying electric power to the above-mentioned devices are required to be thinner and more flexible.

Thin batteries that have been already developed include paper batteries, thin flat batteries and plate-like batteries. These batteries have a hard housing and are excellent in strength. However, this feature could be an obstacle to making the battery more flexible and thinner.

In view of this, development has been made to a battery with high flexibility (hereinafter referred to as a "flexible battery") including a housing made of a thin and flexible film-like material (e.g., a laminated film) (see, e.g., Patent Literatures 1 and 2). These batteries are advantageous also in terms of the energy density. Patent Literature 1 proposes a flexible battery including a sheet-like electrode group obtained by stacking sheet-like positive and negative electrodes with a separator interposed therebetween, and a housing made of a laminated film (hereinafter sometimes referred to as a "laminate housing") enclosing the electrode group.

However, a laminated film used as a material for a laminate housing usually has a metal layer which serves as a barrier layer, and resin layers which serve as a seal layer and a protective layer. Such a laminated film is low in stretchability. Using it as it is for a housing of a battery will limit the improvement in flexibility of the battery. Moreover, if such a laminate housing with low stretchability is forcibly bent, the housing may rupture or break. The rupture or breakage of the laminate housing, if any, may result in evaporation of the electrolyte or deterioration in battery performance.

Conventionally, in order to improve the flexibility of a flexible battery, a proposal has been made to provide the laminate housing with a corrugated portion (see, e.g., Patent Literature 3).

In the case where the laminate housing is provided with a corrugated portion, when the laminate housing is bent, the outside of the corrugated portion will stretch in the direction along which stress is applied, as the length between one top and the next top of a corrugation becomes larger; while the inside of the corrugated portion will shrink in said direction, as the length between one top and the next top of a corrugation becomes smaller. In this manner, the laminated film can deform following the bending of the laminate housing, and thus the flexibility of the flexible battery is improved.

CITATION LIST

Patent Literature

[PTL 1] Japanese Laid-Open Patent Publication No. Hei 11-345599
[PTL 2] Japanese Laid-Open Patent Publication No. 2008-71732
[PTL 3] Japanese Laid-Open Patent Publication No. 2000-173559

SUMMARY OF INVENTION

Technical Problem

However, forming a housing from the laminated film provided with a corrugated portion as proposed by Patent Literature 3 may result in reduced sealing reliability of the housing, such as easy entry of moisture into the housing from the periphery thereof.

In view of the above, the present invention intends to provide a flexible battery having high flexibility and improved sealing reliability, and a production method of the same.

Solution to Problem

One aspect of the present invention relates to a flexible battery including a sheet-like electrode group, an electrolyte, and a housing with flexibility enclosing the electrode group and the electrolyte. The housing includes a film material folded into two in which the electrode group is inserted. The film material has two facing portions respectively facing two principal surfaces of the electrode group, a fold line which is between the two facing portions and along which the film material is folded, and two bonding margins respectively set around the two facing portions. The two bonding margins are bonded to each other into a bonded portion. At least the two facing portions of the film material are formed in a corrugated shape having a plurality of ridge lines and a plurality of valley lines arranged in parallel to each other, and the ridge lines in one of the two facing portions are overlapped with the valley lines in the other of the two facing portions. The fold line is parallel to the ridge lines and the valley lines.

Another aspect of the present invention relates to a method for producing a flexible battery comprising a sheet-like electrode group, an electrolyte, and a housing with flexibility enclosing the electrode group and the electrolyte. The method includes the steps of:

forming a film material into a corrugated shape having a plurality of ridge lines and a plurality of valley lines arranged in parallel to each other, and then folding the film material into two along a fold line parallel to the ridge lines and the valley lines, such that the ridge lines in one of portions to be opposed to each other overlap the valley lines in the other of the portions, or alternatively, folding a film material into two along the fold line, and then forming the film material into a corrugated shape having a plurality of ridge lines and a plurality of valley lines arranged in parallel to each other, such that the ridge lines in one of portions to be opposed to each other overlap the valley lines in the other of the portions;

inserting the electrode group into the film material folded into two along the fold line; and bonding two bonding margins to each other, the bonding margins being set on sides around two facing portions respectively facing two principal surfaces of the electrode group, except a side including the fold line.

Advantageous Effects of Invention

According to the present invention, it is possible to impart high flexibility to a flexible battery including a housing with flexibility, as well as to improve the sealing reliability of the flexible battery. As a result, for example, in the case where the present invention is applied to a battery used for a patch-type supplying device that operates while a battery serving as a power supply is in contact with a living body, the discomfort caused by the rigidity of the battery can be reduced. In addition, the battery is excellent not only in flexibility but also in sealing reliability, and therefore, leakage of electrolyte and the like will not occur, allowing for long-term storage or use of the device.

DESCRIPTION OF EMBODIMENTS

The present invention relates to a flexible battery including a sheet-like electrode group, an electrolyte, and a housing with flexibility enclosing the electrode group and the electrolyte. The housing includes a film material folded into two in which the electrode group is inserted. The film material has two facing portions respectively facing two principal surfaces of the electrode group, a fold line which is between the two facing portions and along which the film material is folded, and two bonding margins respectively set around the two facing portion.

The two bonding margins are bonded to each other into a bonded portion. At least the two facing portions of the film material are formed in a corrugated shape having a plurality of ridge lines and a plurality of valley lines arranged in parallel to each other. The fold line is parallel to the ridge lines and the valley lines. In each of the two facing portions, it suffices if at least part thereof is formed in the corrugated shape. The ridge lines are a plurality of parallel lines tracing the highest points of the peaks (ridges) of corrugations, as seen from the side of the film material to be the outside of the housing. The valley lines are a plurality of parallel lines tracing the lowest points of the troughs (valleys) of corrugations, as seen from the side of the film material to be the outside of the housing.

According to the above configuration, the housing used for the flexible battery of the present invention is typically formed such that, for example, one film material (e.g., a laminated film) rectangular in shape is folded into two, and, for example, a rectangular electrode group is inserted into the two-folded film material. The two-folded film material has two facing portions respectively facing the principal surfaces of the electrode group, and the facing portions are, for example, in contact with the fold line. The portions around the two facing portions, for example, except the side of the fold line, are bonded to each other by, for example, fusion bonding, into a bonded portion of the housing. The film material is thus formed like a thin pouch.

Of one film material, at least the two facing portions are formed in a corrugated shape. As such, the film material can deform more freely following the bending of the housing. This imparts a high flexibility to the flexible battery.

Furthermore, according to the present invention, a fold line parallel to the ridge lines and the valley lines is formed such that the ridge lines in one of the two facing portions are overlapped with the valley lines in the other of the two facing portions. This makes it easy to improve the sealing reliability of the flexible battery. Description is given below on this point.

Figure 7:
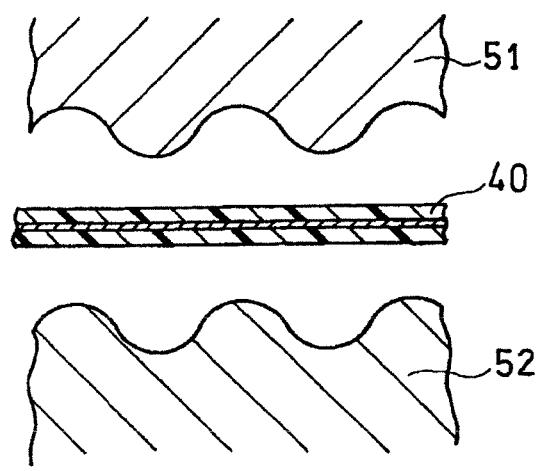

In the conventional flexible batteries, for example, as proposed by Patent Literature 3, separate film materials formed in the corrugated shape are overlapped (see FIG. 1 of Patent Literature 3), or one film formed in the corrugated shape is folded along a line perpendicular to the ridge and valley lines of the corrugated shape (see FIG. 7 of Patent Literature 3). Therefore, in bonding the peripheral portions (bonding margins) of the film material(s) to each other, the corrugated shapes of the bonding margins tend to get misaligned.

Figure 24:
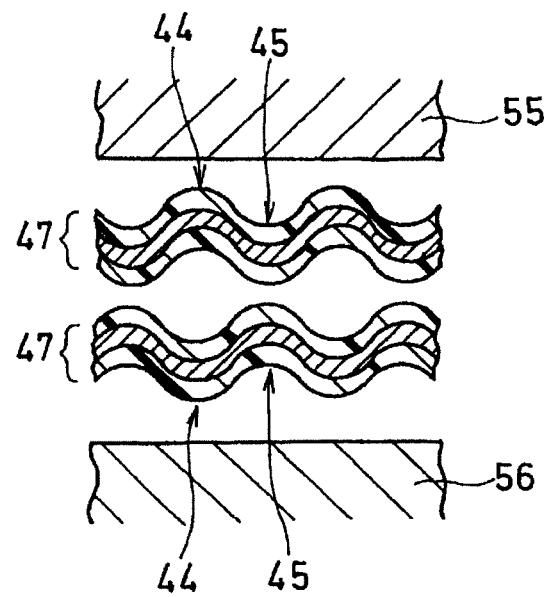

This is because, for example, in the case of piling separate two film materials, it is difficult to position them such that the corrugated shapes of the bonding margins of the two materials fit together without misaligned. This tends to result in insufficient bonding at the bonded portion. On the other hand, in the case of folding one film material into two along a line perpendicular to the ridge and valley lines, the folded film material will be in such a state that the ridge lines in one of the bonding margins opposed to each other are overlapped with those of the other, and the valley lines in one of the bonding margins opposed to each other are overlapped with those of the other (this is a state as illustrated in FIG. 24, this state is hereinafter sometimes referred to as a "state in which the corrugations are out of phase from each other by 180°"). In such a state, the formed bonded portion is likely to have voids unless the bonding margins are fusion bonded under a very large pressure. As such, the bonding at the bonded portion tends to be very insufficient.

Figure 6:
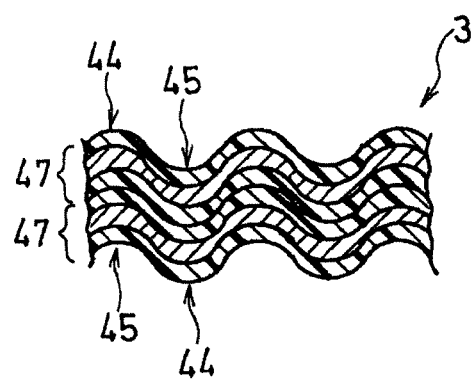

In the flexible battery of the present invention, the fold line along which the film material is folded into two is parallel to the ridge and valley lines formed in the opposing portions. As such, provided that the two bonding margins are formed in the corrugation shape such that they form continuous corrugations with the two facing portions, exact positioning is possible, when bonding the bonding margins to be in such a state that the corrugated shapes of the bonding margins are exactly fitting to each other (this is a state as illustrated in FIG. 6, this state is hereinafter sometimes referred to as a "state in which the corrugations are in phase with each other"). Therefore, a flexible battery having excellent sealing reliability can be easily produced.

In one embodiment of the present invention, the bonded portion has a plurality of perpendicular sections extending perpendicularly to the fold line, and a parallel section extending in parallel to the fold line on the side opposite to the fold line. The perpendicular sections are formed in the corrugated shape, and the two facing portions and the perpendicular sections form continuous corrugations. The resultant state is that the ridge lines in a portion of one of the two bonding margins corresponding to the perpendicular sections are overlapped with the valley lines in a portion of the other (i.e., a state in which the corrugations are in phase with each other). Therefore, as described above, the bonding margins can be easily positioned such that they will be bonded, with the corrugations being in phase with each other. As a result, the sealing reliability at the bonded portion can be readily improved.

In another embodiment of the present invention, the perpendicular sections are flat without being formed in the corrugated shape. By not forming the perpendicular sections of the bonded portion into the corrugated shape also, it is possible to prevent the corrugated shapes in the bonding margins from getting misaligned. Thus, the sealing reliability at the bonded portion can be improved.

Here, the parallel section of the bonded portion may or may not be formed in the corrugated shape. In the case where the parallel section is formed in the corrugated shape, by setting the position of the fold line as described above, the corrugations in the portions of the two bonding margins corresponding to the parallel section are easily and exactly brought into phase with each other. Thus, the sealing reliability of the flexible battery can be readily improved. On the other hand, in the case where the parallel section is not formed in the corrugated shape and left flat, the corrugations in the portions of the two bonding margins corresponding to the parallel section will not get misaligned. Thus, the sealing reliability of the flexible battery can be readily improved.

The width of the bonded portion is preferably set to 1 to 10 mm. By setting the width of the bonded portion to be 1 mm or more, the entry of moisture into the housing can be easily suppressed. By setting the width of the bonded portion to be 10 mm or less, the increase of the proportion of the site that makes no contribution to the battery reaction can be suppressed. Therefore, the decrease in energy density of the flexible battery can be prevented. It is more preferable to include a polymer electrolyte in the electrolyte, because this can easily suppress the leakage of electrolyte.

The film material may be a laminated film having a metal layer and a resin layer. The inclusion of a metal layer or ceramics layer in the film material can prevent the evaporation of electrolyte and the entry of moisture into the housing. The inclusion of a resin layer in the film material can protect the metal layer as well as improve the sealing property at the bonded portion. It is preferable to provide resin layers on both sides of the metal layer to sandwich the metal layer therebetween, because this can mechanically and chemically protect the metal layer.

Furthermore, the present invention relates to a method for producing a flexible battery including a sheet-like electrode group, an electrolyte, and a housing with flexibility enclosing the electrode group and the electrolyte. The production method includes the steps of: forming a film material into a corrugated shape having a plurality of ridge lines and a plurality of valley lines arranged in parallel to each other, and then folding the film material into two along a fold line parallel to the ridge lines and the valley lines, such that the ridge lines in one of portions to be opposed to each other overlap the valley lines in the other of the portions, or alternatively, folding a film material into two along the fold line, and then forming the film material into a corrugated shape having a plurality of ridge lines and a plurality of valley lines arranged in parallel to each other, such that the ridge lines in one of portions to be opposed to each other overlap the valley lines in the other of the portions; inserting the electrode group into the film material folded into two along the fold line; and bonding two bonding margins to each other, the bonding margins being set on sides around two facing portions respectively facing two principal surfaces of the electrode group, except the side including the fold line. In forming the film material into the corrugated shape, portions corresponding to the two bonding margins may not be formed into the corrugated shape and left flat, or may be formed into the corrugated shape.

Embodiments of the present invention are described below with reference to the appended drawings.

Embodiment 1

Figure 1:
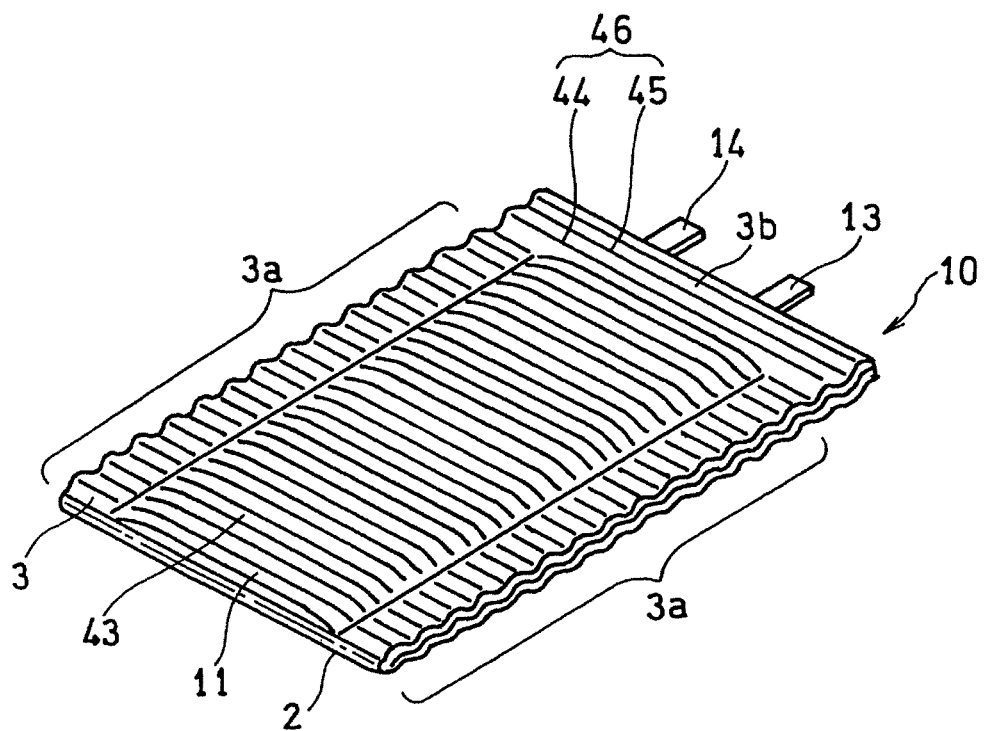
FIG. 1 An oblique view of the appearance of a flexible battery according to one embodiment of the present invention FIG. 2 A partial cross-sectional view of the structure of an electrode group FIG. 3 A plane view of an exemplary negative electrode FIG. 4 A plane view of an exemplary positive electrode FIG. 5 A partial cross-sectional view of the structure of a laminated film being a material for a housing FIG. 6 A partial cross-sectional view of the bonded section of a housing FIG. 7 A partial cross-sectional view illustrating the case where a laminated film is formed into a corrugated shape with a die set for forming corrugations, before being folded into two FIG. 8 A plane view of an exemplary laminated film formed in a corrugated shape FIG. 9 An oblique view of the laminated film of FIG. 8 folded into two in which an electrode group is inserted FIG. 10 An oblique view of an exemplary die set for forming a bonded portion by fusion bonding FIG. 11 A partial cross-sectional view illustrating the case where the bonding margins formed in a corrugated shape of the laminated film of FIG. 9 are fusion bonded with the die set of FIG. 10.
Figure 2:
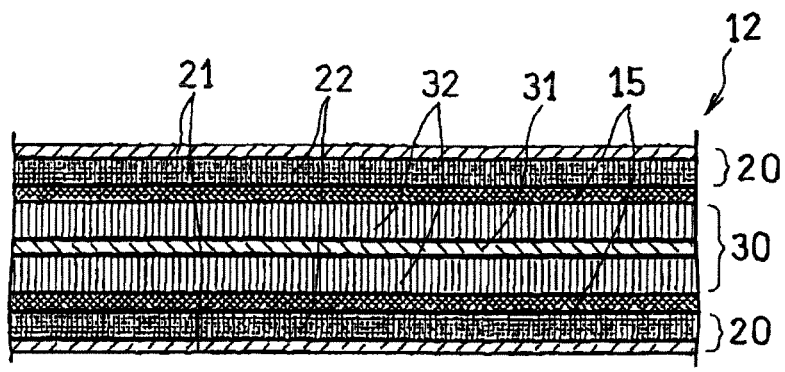
Figure 3:
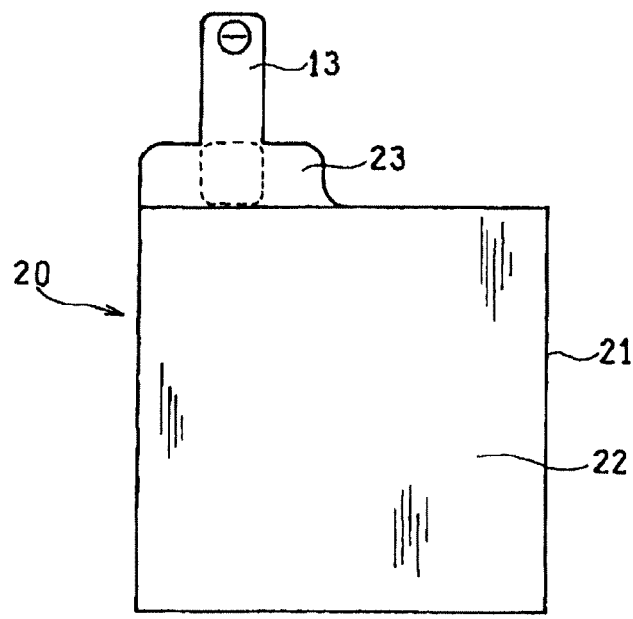
Figure 4:
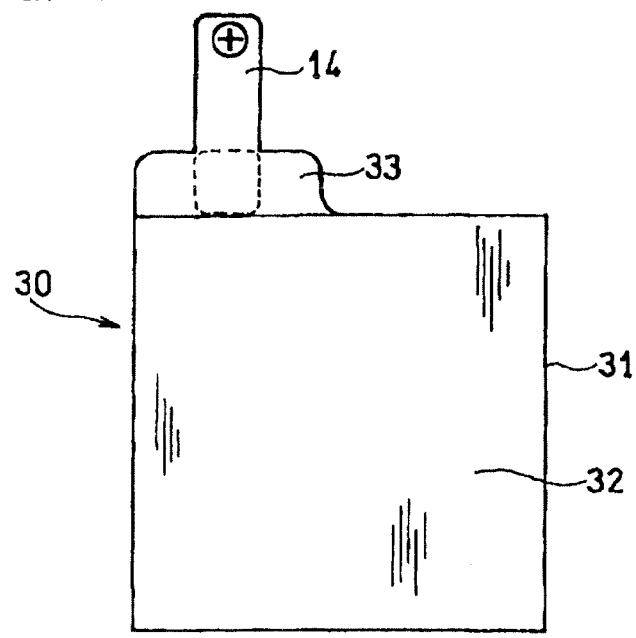
Figure 5:
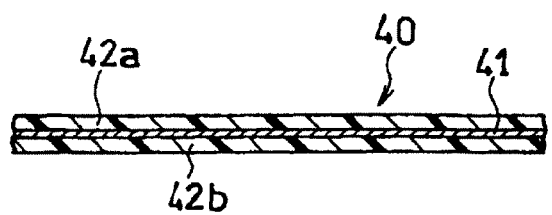

FIG. 1 is an oblique view of the appearance of a flexible battery produced by the production method of a flexible battery according to one embodiment of the present invention. FIG. 2 is a partial cross-sectional view of an exemplary electrode group included in the battery of FIG. 1. FIGS. 3 and 4 are plane views of exemplary positive electrode and negative electrode included in the electrode group. FIG. 5 is a partial cross-sectional view of the structure of a laminated film being an exemplary material for a housing.

A flexible battery (hereinafter simply referred to as a "battery") 10 illustrated in the figure includes: a sheet-like electrode group 12 obtained by stacking a sheet-like negative electrode 20 and a sheet-like positive electrode 30 with an electrolyte layer (a sheet-like separator impregnated with electrolyte) 15; and a housing 11 hermetically enclosing the electrode group 12. The shape of the battery 10 may be flat-plate like or curved-plate like. Although the illustrated battery 10 is a secondary battery, the present invention can be applied to a primary battery including a sheet-like electrode group.

The negative electrode 20 has a sheet-like negative electrode current collector 21 and a negative electrode active material layer 22 provided on one surface or both surfaces of the negative electrode current collector 21. The positive electrode 30 has a sheet-like positive electrode current collector 31 and a positive electrode active material layer 32 provided on one surface or both surfaces of the positive electrode current collector 31. The positive electrode 30 and the negative electrode 20 are arranged such that the positive electrode active material layer 32 faces the negative electrode active material layer 22 with the electrolyte layer 15 interposed therebetween.

In each of the two negative electrodes 20 illustrated in FIG. 2, the negative electrode active material layer 22 is provided only on one surface of the negative electrode current collector 21. In the positive electrode 30, the positive electrode active material layer 32 is provided on both surfaces of the positive electrode current collector 31. In the illustrated electrode group 12, two negative electrodes 20 are arranged with one positive electrode 30 interposed therebetween, such that the negative electrode active material layers 22 face the positive electrode 30.

As illustrated in FIGS. 3 and 4, the negative electrode current collector 21 and the positive electrode current collector 31 have a rectangular or approximately rectangular flat plate-like shape, and have a negative electrode current collector tab 23 and a positive electrode current collector tab 33 which extend outwardly from one side of the each current collector. A negative electrode lead 13 is connected to the negative electrode current collector tab 23, and a positive electrode lead 14 is connected to the positive electrode current collector tab 33. These leads are extended out of the housing 11. The outwardly extended portions function as a negative electrode terminal and a positive electrode terminal. At least one corner of each lead may be chamfered. When shaped like this, the lead is unlikely to get snagged and cause damage to the tab. In addition, the negative and positive electrode current collector tabs 23 and 33 can be connected in series and/or in parallel, by welding or riveting.

FIG. 5 is a cross-sectional view of an exemplary laminated film being a material for a housing. A laminated film 40 illustrated in the figure is composed of a water-vapor barrier layer 41 made of a metal foil, and resin layers 42a and 42b formed on both surfaces of the barrier layer 41. The material for the housing 11 of the present invention is not limited to the laminated film 40, and may be any film material that has shape-retaining property that allows for the formation of the corrugated shape, water tightness that can prevent the evaporation of electrolyte and the entry of water vapor, corrosion resistance, and flexibility, and it may be a single-layered material film composed of a metal layer, a ceramics layer, or a resin layer.

The illustrated housing 11 is formed by folding one rectangular laminated film 40 into two, along a fold line 2 nearly in the middle of the film in its longitudinal direction. The fold line 2 is perpendicular to the longitudinal direction of the laminated film 40. The electrode group 12 is inserted in the two-folded laminated film 40. Portions of the housing 11 facing two principal surfaces of the electrode group 12 are referred to as facing portions 43. The two facing portions 43 are in proximity or contact with the fold line 2. The shape of the laminated film 40 is not limited to rectangular, and may be any shape that can be folded into two along one fold line in an overlapping manner (a line-symmetrical shape). The shape of the electrode group 12 may also be set to any shape according to the shape of the two-folded laminated film 40.

On sides around the facing portions 43 of the housing 11, except the side including the fold line 2, a bonded portion 3 is formed by bonding portions of the two-folded laminated film 40. The bonded portion 3 includes a plurality of (two in the figure) perpendicular sections 3a extending perpendicularly to the fold line 2, and a parallel section 3b extending in parallel to the fold line 2 on the side opposite to the fold line 2.

In the illustrated housing 11, the entire region thereof is formed in a corrugated shape 46 including a plurality of ridge lines 44 and a plurality of valley lines 45 arranged alternately at equal pitches in parallel to each other. The ridge and valley lines 44 and 45 are also perpendicular to the longitudinal direction of the laminated film 40. Accordingly, the fold line 2 is parallel to the ridge lines 44 and the valley lines 45. The cross-sectional shape of the corrugated shape 46 is not particularly limited, and may be, for example, arched, sinusoidal, rectangular, or wedgy. The pitch between the ridge lines 44 (or the valley lines 45) may be set to any value within the range, for example, from 1 to 50 mm. The pitch between the ridge lines 44 and between the valley lines 45 may not be necessarily constant, and may be changed depending on the distance from the fold line 2. For example, the pitch between the ridge lines 44 and between the valley lines 45 may be decreased near the central portion of the housing 11 of FIG. 1 in its longitudinal direction so that the flexibility in the central portion can be improved. In this case, the pitches on the front and back sides of the housing 11 must be set to be identical to each other.

FIG. 6 is a partial cross-sectional view of an exemplary bonded section of the housing. In the illustrated bonded portion 3, the corrugated shape 46 in one of bonding margins 47 to be opposed to each other when one laminated film 40 is folded into two along the fold line 2 fits to the corrugated shape 46 in the other of the bonding margins 47. In other words, the ridge lines 44 in one of the bonding margins 47 of the laminated film 40 to be opposed to each other are overlapped with the valley lines 45 in the other, and the valley lines 45 in one of the bonding margins 47 are overlapped with the ridge lines 44 in the other. This state is hereinafter sometimes referred to as a "state in which the corrugated shapes in the two bonding margins 47 are in phase with each other". Here, the ridge lines 44 and the valley lines 45 are terms determined when the laminated film 40 is seen from the side to be the outside of the housing 11.

The laminated film 40 may be formed into the corrugated shape 46 and then folded into two along the fold line 2 (the first method), or alternatively, the laminated film 40 may be folded into two along the fold line 2 and then formed into the corrugated shape 46 (the second method).

Figure 8:
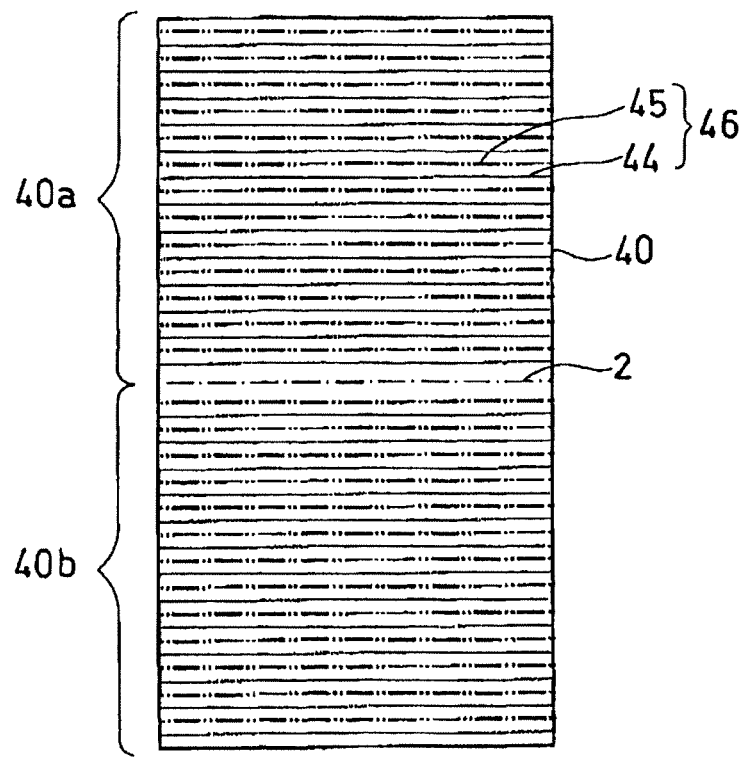

According to the first method, as illustrated in FIG. 7, the laminated film 40 before being folded into two along the fold line 2 is formed into the corrugated shape 46 using a die set including upper and lower dies 51 and 52 for forming corrugations. As a result, as illustrated in FIG. 8, the corrugated shape 46 including the ridge and valley lines 44 and 45 is formed over the entire region of the laminated film 40. It is to be noted that, as illustrated in FIG. 8, the area at or near the portion to be the fold line 2 of the laminated film 40 is preferably not be formed into the corrugated shape 46 for improving the sealing property at or near the fold line 2.

Thereafter, the fold line 2 parallel to the ridge and valley lines 44 and 45 is formed at such a position that the corrugated shape 46 of one portion 40a of the two-folded laminated film 40 becomes in phase with that of the other portion 40b. Along the fold line 2, the laminated film 40 is folded into two.

Figure 9:
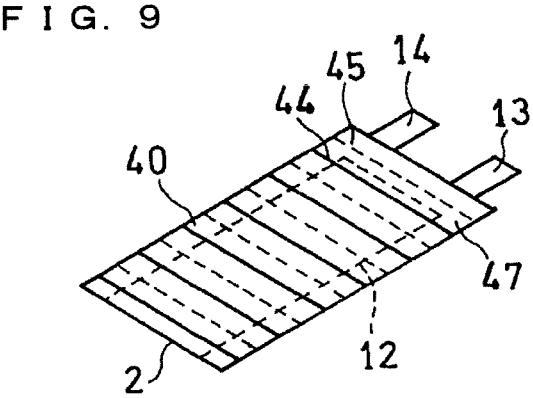

Next, as illustrated in FIG. 9, the electrode group 12 is inserted into the two-folded laminated film 40, with a part of the negative electrode lead 13 and a part of the positive electrode lead 14 being extended outwardly from the side opposite to the fold line 2. At this time, the electrode group 12 is arranged such that the fold line 2 and one side (one short side in the figure) of the rectangular electrode group 12 come in contact with each other, and the remaining three sides around each facing portion 43, except the side including the fold line 2, are left as the bonding margins 47.

Figure 10:
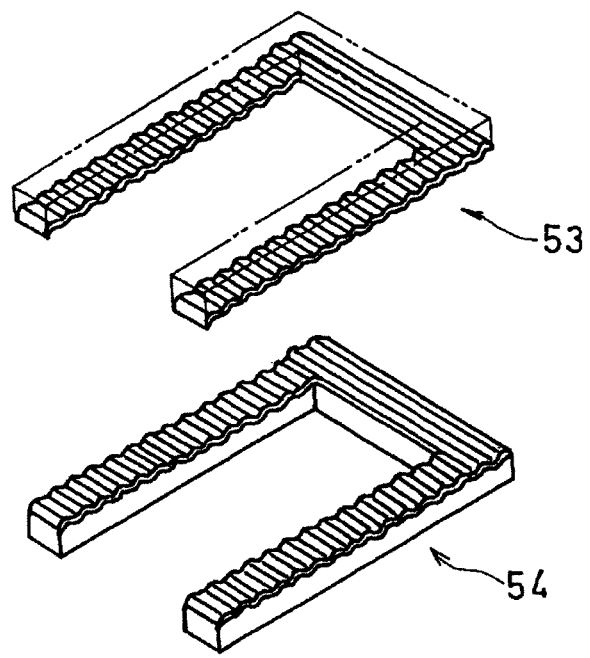

Subsequently, the laminated film 40 in the state as illustrated in FIG. 9 is placed in an atmosphere having predetermined gas composition and pressure. The bonding margins 47 opposed to each other are bonded in this atmosphere, using a die set for forming a bonded portion by fusion bonding including upper and lower dies 53 and 54 as illustrated in FIG. 10.

Figure 11:
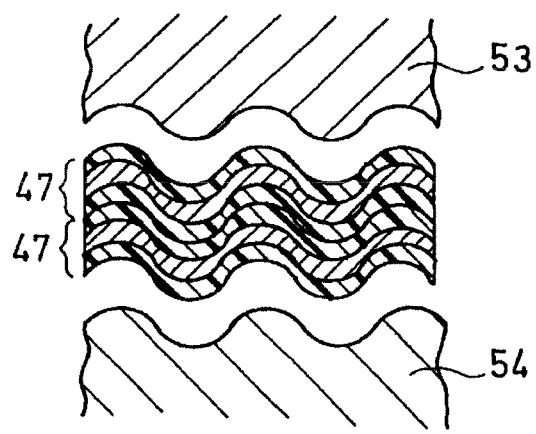

The opposing surfaces of the upper die 53 and the lower die 54 are corrugated at the same pitches as those of the corrugated shape 46. The upper and lower dies 53 and 54 are vertically arranged in the in-phase position as illustrated in FIG. 11 such that the corrugations of one die will fit to those of the other. Then, as illustrated in FIG. 11, the bonding margins 47 with the corrugated shapes being in phase with each other are placed between the upper and lower dies 53 and 54 such that the corrugated shapes thereof become in phase with the corrugations of the dies. The bonding margins 47 are heated while pressed between the upper and lower dies 53 and 54, and thus, the bonded portion 3 formed by fusion bonding is obtained. In such a manner, a flexible battery including the housing 11 made of the laminated film 40 in which the electrode group 12 and an electrolyte are hermetically enclosed is produced by the first method.

Figure 12:
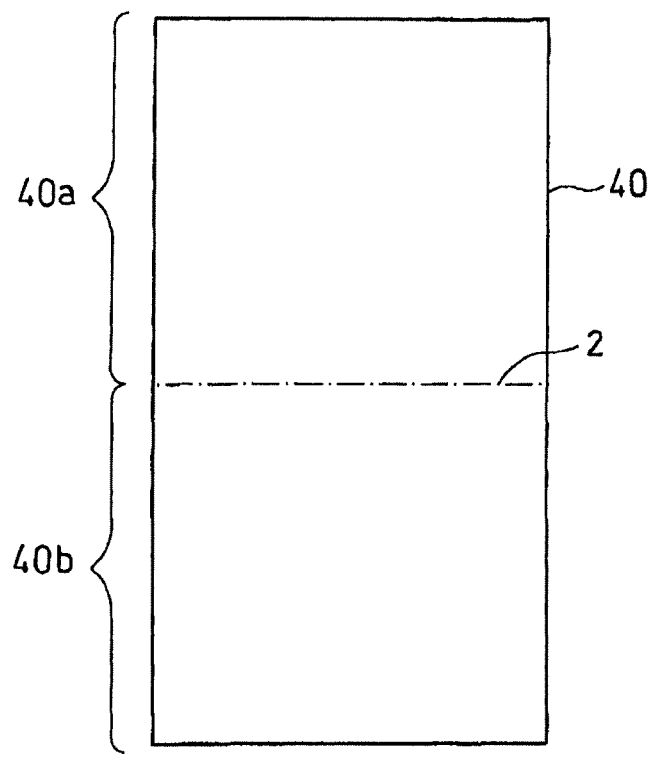
FIG. 12 A plane view of an exemplary laminated film to be folded into two before being formed into a corrugated shape FIG. 13 A partial cross-sectional view illustrating the case where a laminated film is folded into two, and then the laminated film is formed into a corrugated shape with a die set for forming corrugations FIG. 14 An oblique view of another exemplary die set for forming a bonded portion by fusion bonding FIG. 15 A partial cross-sectional view illustrating the case where the bonding margins formed in a corrugated shape of the laminated film of FIG. 13 are fusion bonded with the die set of FIG. 14
Figure 13:
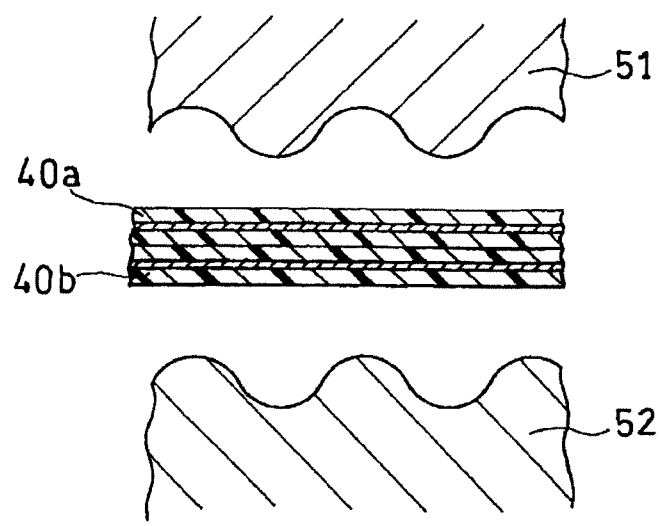

According to the second method, the rectangular laminated film 40 as illustrated in FIG. 12 which is not yet formed in the corrugated shape is first folded in the middle in the longitudinal direction of the film, so as to form the fold line 2 running perpendicular to the longitudinal direction. Thereafter, as illustrated in FIG. 13, the laminated film 40 folded into two along the fold line 2 is formed into the corrugated shape 46, using the upper and lower dies 51 and 52 for forming corrugations.

Thus, the entire region of the two-folded laminated film 40 is formed in the corrugated shape 46 including the ridge and valley lines 44 and 45. At this time, the ridge and valley lines 44 and 45 are formed in parallel to the fold line 2. The bonding margins 47 are then bonded to each other in the similar manner to that in the first method, and as a result, a flexible battery having high flexibility and excellent sealing reliability can be obtained.

Figure 14:
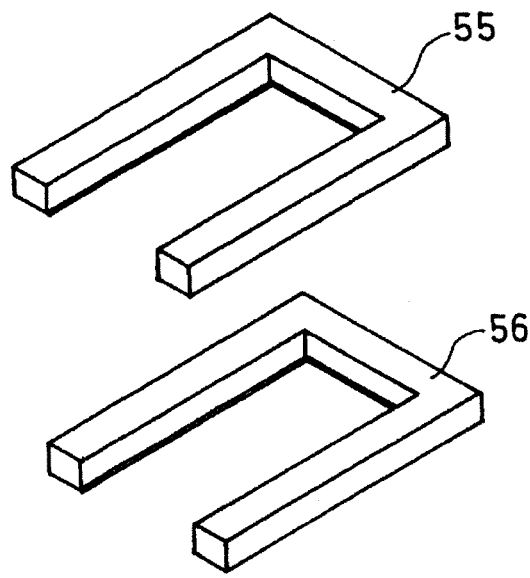
Figure 15:
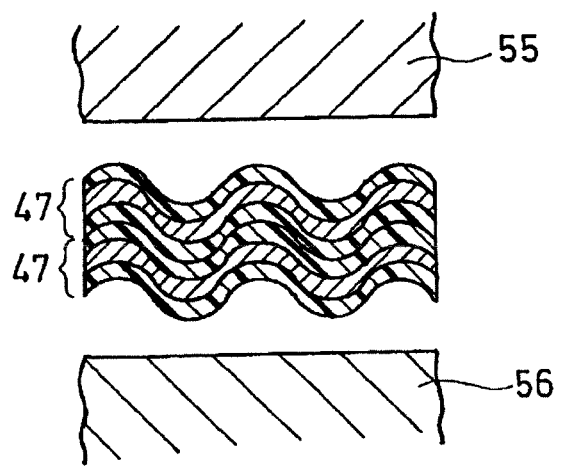

In the above description of the first and second methods, dies as illustrated in FIG. 10 whose opposing surfaces are corrugated are used as the dies for forming a bonded portion by fusion bonding. However, this should not be construed as limitation, and the dies for forming a bonded portion by fusion bonding may be upper and lower die 55 and 56 as illustrated in FIG. 14 whose opposing surfaces are flat. As illustrated in FIG. 15, the bonding margins 47 with the corrugated shapes being in phase with each other are placed between the upper and lower die 55 and 56. In this state, the bonding margins 47 are heated while pressed between the upper and lower dies 55 and 56, and thus, the bonded portion 3 formed by fusion bonding is obtained. According to this method, it is not necessary to align the corrugations of the upper and lower dies in phase with the corrugated shapes of the bonding margins 47, and therefore, the bonded portion 3 can be formed more easily and conveniently. On the other hand, in the case of using the upper and lower dies 51 and 52 whose opposing surfaces are corrugated (see FIG. 11), the bonding margins 47 can be pressed along the corrugations, and the bonding margins 47 can be bonded more reliably, which is more advantageous in terms of improving the sealing reliability.

Description is given below of each component of the flexible battery of the present invention, with exemplifying preferred materials.

[Housing]

The housing is preferably composed of a highly flexible material with excellent flex resistance (e.g., a film-like material). Specifically, the housing is composed of a laminated film, and the laminated film includes a water-vapor barrier layer, and a resin layer provided on one surface or both surfaces of the barrier layer. The barrier layer is a metal layer or a ceramics layer.

The metal layer is preferably made of aluminum, titanium, nickel, stainless steel, gold, or silver, in view of the strength and bending resistance. The ceramic layer is preferably made of silicon oxide, magnesium oxide, or aluminum oxide. Among them, aluminum, aluminum oxide, and silicon oxide are particularly preferred because of their low production cost and excellent barrier property.

The thickness of the barrier layer is preferably 5 to 50 µm. The thickness of the resin layer, both on the inside and the outside of the housing, is preferably 5 to 100 µm. The thickness of the laminated film is preferably 15 to 300 µm, and more preferably 30 to 150 µm. By using a laminated film having such a thickness, it is possible to reduce the thickness of the thin battery, while ensuring the strength and flexibility of the housing.

In view of the strength, impact resistance, and electrolyte resistance, the resin layer on the inside of the housing is preferably made of, for example, polyolefin such as polyethylene (PE) or polypropylene (PP), a modified product thereof, polyethylene terephthalate (PET), polybutylene terephthalate (PBT), polyamide, polyurethane, polyethylene-vinyl acetate copolymer (EVA), or an ionomer resin. The surface roughness of the resin layer on the inside of the housing is generally 0.01 to 1 μm.

In view of the strength, impact resistance, and chemical resistance, the resin layer on the outside of the housing is preferably made of, for example, polyamide (PA) such as 6,6-nylon or 6-nylon, or polyester such as PET or PBT.

Specifically, the housing is composed of, for example, an acid-modified-PP/PET/Al/PET laminated film, an acid-modified-PE/PA/Al/PET laminated film, an ionomer-resin/Ni/PE/PET laminated film, an EVA/PE/Al/PET laminated film, or an ionomer-resin/PET/Al/PET laminated film. The Al layer and Ni layer may be replaced with a ceramics layer such as $Al_2O_3$ layer or $SiO_2$ layer.

[Electrode]

Sheet-like electrodes suitable for a thin battery are used. The plane shape of the electrode is not particularly limited, but is preferably circular, elliptic, belt-like, rectangular, or approximately rectangular. An "approximately rectangular" shape is, for example, a rectangular shape with four corners chamfered, or a rectangular shape with four corners rounded into arcs (R-shaped).

(Negative Electrode)

The negative electrode includes a negative electrode current collector and a negative electrode active material layer adhering to one surface or both surfaces of the negative electrode current collector. The negative electrode active material layer is formed by: press-fitting or vapor-depositing a negative electrode active material to or on the negative electrode current collector, or alternatively, applying a material mixture including a negative electrode active material onto the negative electrode current collector; and then rolling.

The negative electrode active material may be selected as appropriate from known materials and compositions. For example, a lithium-based negative electrode, various natural and artificial graphites, a silicide, a silicon oxide, or various alloy materials may be used to produce a thin battery with high energy density. Among them, a lithium-based negative electrode is preferred in that a thin battery with higher capacity and higher energy density can be realized.

In the case of using a lithium-based negative electrode, the negative electrode active material layer is preferably a lithium metal layer or a lithium alloy layer, which has a high capacity. Examples of the lithium alloy include Li—Si alloy, Li—Sn alloy, Li—Al alloy, Li—Ga alloy, Li—Mg alloy, and Li—In alloy. In view of improving the negative electrode capacity, the content of elements other than Li in the lithium alloy is preferably 0.1 to 10 mass %.

The negative electrode current collector may be a metal foil. The metal foil may be an electrolytic metal foil obtained by electrolysis, or a rolled metal foil obtained by rolling. The electrolytic metal foil is obtained by, for example, a drum simulated as an electrode is immersed in an electrolytic bath containing a predetermined metal ion, passing a current through the drum while being rotated, to deposit a predetermined metal on the surface of the drum, and separating the deposited metal. The electrolysis is advantageous in excellent mass-productivity, and comparatively low production cost. The rolling is advantageous in easily producing a thinner metal foil, and reducing the weight. The rolled metal foil, in which the crystals are oriented in the rolling direction, is excellent in bending resistance, and can be suitably used for a thin battery.

(Electrolyte Layer)

The electrolyte layer has a function of separating the positive electrode from the negative electrode, and contains an electrolyte that allows for ion migration. The electrolyte may be liquid, gel or solid. A non-aqueous electrolyte is most preferred because it has a wide potential window. The electrolyte layer may contain any component other than the electrolyte, as long as the purpose thereof is not impaired. For example, for the purpose of improving the strength, homogeneity, and ion conductivity of the electrolyte layer, a filler such as inorganic particles or resin particles may be added to the electrolyte layer. Examples of the inorganic particles include alumina fine particles and silica fine particles. In addition, the electrolyte layer may include a non-woven fabric or an oriented sheet of resin as a separator (a porous sheet), in order to prevent short circuit between the positive and negative electrodes.

The separator preferably has ion permeability, as well as excellent mechanical strength and insulating property. Examples of a material for such a separator include polypropylene, polyethylene, cellulose, polyethylene terephthalate, polyphenylene sulfide, polyamide, and polyimide. A preferred oriented sheet is a microporous film containing either polypropylene or polyethylene, or both, because the film has a shutdown function. A separator including such a microporous film and a highly heat resistant layer of polyamide or the like laminated thereon has a shutdown function and is excellent in short-circuit resistance.

A liquid electrolyte may be a solution comprising a solvent and a solute (a supporting salt) dissolving in the solvent, and further comprising various additives, if necessary.

A gel electrolyte (a gel polymer electrolyte) is generally a gel comprising a liquid electrolyte and a polymer material impregnated therewith. The polymer material serving as a matrix of the gel polymer electrolyte may be any polymer material that will be gelled by absorbing a liquid electrolyte. Examples of such a polymer material include: poly(meth) acrylate polymers having an ester unit, such as silicone, acrylic acid, acrylic acid ester, methacrylic acid, or methacrylic acid ester, as a principal component (e.g., 90 mol % or more); polyacrylonitrile; polyphosphazene; polyethylene oxide; polypropylene oxide; and fluorine polymer. These polymer materials may be used singly or as a mixture or composite of two or more. Furthermore, these polymer materials may be cross-linked or modified, as appropriate.

Among the above-exemplified polymer materials, a fluorine polymer, in particular, is highly resistive to oxidation and reduction, and thus is suitable for allowing a liquid non-aqueous electrolyte to be absorbed therein. It is preferable to use, for example, polyvinylidene fluoride, vinylidene fluoride-hexafluoropropylene copolymer, vinylidene fluoride-trifluoroethylene copolymer, or vinylidene fluoride-tetrafluoroethylene copolymer, singly or as a mixture of two or more.

A solid electrolyte may be a powder or deposited film of various inorganic solid electrolytes, or a dry polymer electrolyte. Examples of the inorganic solid electrolytes include: lithium halides such as lithium iodide, and derivatives thereof; lithium nitride; oxyacid salt-based materials; and sulfide-based materials. The dry polymer electrolyte is a polymer material with a solute (supporting salt) added thereto, and is free of solvent.

Examples of the polymer material serving as a matrix of the dry polymer electrolyte include: ether polymers such as polyethylene oxide, and cross-linked products thereof; and poly (meth)acrylate polymers. These may be a polymer of one monomer, or a copolymer of two or more monomers. These polymer materials may be used singly or as a mixture or composite of two or more.

Among the above examples, an electrolyte layer containing a dry polymer electrolyte or gel polymer electrolyte is preferred, in view of preventing the electrolyte components from leaking outside in the event where the housing is damaged. Various fillers may be added to the dry polymer electrolyte or gel polymer electrolyte. Alternatively, the dry polymer electrolyte or gel polymer electrolyte is impregnated into or allowed to adhere to the separator serving as a support, to form an electrolyte layer.

When a dry polymer electrolyte or gel polymer electrolyte is used, it is not necessary to provide a means for preventing the leakage of electrolyte. Therefore, it is possible to easily make the thin battery smaller in size, lighter in weight, and further thinner in thickness. Furthermore, by using a dry polymer electrolyte or gel polymer electrolyte, the electrolyte layer also is imparted with followability to bending. As such, the adhesion between the electrodes is further improved, and variations and deterioration of the battery performance are significantly suppressed even after repeated bending.

(Positive Electrode)

The positive electrode includes a positive electrode current collector and a positive electrode active material layer adhering to one surface or both surfaces of the positive electrode current collector. The positive electrode active material layer is formed by: vapor-depositing a positive electrode active material on the positive electrode current collector, or alternatively, applying a material mixture including a positive electrode active material onto the positive electrode current collector; and then rolling. The positive electrode material mixture further includes a binder in addition to a positive electrode active material, and further includes a conductive agent, as needed.

Examples of the positive electrode active material include: manganese dioxide; fluorinated carbons; organic or inorganic sulfides; lithium-containing composite oxides; metal oxides such as vanadium oxide or niobium oxide, or lithiated products thereof; conjugated organic polymer with conductivity; Chevrel-phase compounds; and olivine-type compounds. Preferred among them are manganese dioxide, fluorinated carbons, sulfides, and lithium-containing composite oxides, and particularly preferred is manganese dioxide.

Given that the reaction of manganese dioxide in the battery is a one-electron reaction, the theoretical capacity per mass of the positive electrode active material is 308 mAh/g, which is a high capacity. In addition, manganese dioxide is inexpensive. A particularly preferred manganese dioxide is electrolytic manganese dioxide because it is easily available. Manganese dioxide may contain a very small amount of impurities which have inevitably entered in the production process. The positive electrode active material may be a mixture which is mainly composed of manganese dioxide and contains a material other than manganese dioxide, such as a fluorinated carbon, vanadium oxide, or olivine-type compound.

Examples of the fluorinated carbons include fluorinated graphite represented by $(CF_w)_m$, where m is an integer of one or more, and $0<w\leq1$. Examples of the sulfides include $TiS_2$, $MoS_2$, and $FeS_2$. Examples of the lithium-containing composite oxides include $Li_{xa}CoO_2$, $LLNiO_2$, $Li_{xa}MnO_2$, $Li_{xa}Co_yNi_{1-y}O_2$, $Li_{xa}Co_yM_{1-y}O_z$, $Li_{xa}Ni_{1-y}M_yO_z$, $Li_{xb}Mn_2O_4$, and $Li_{xb}Mn_{2-y}M_yO_4$. In the above formulae, M is at least one selected from the group consisting of Na, Mg, Sc, Y, Mn, Fe, Co, Ni, Cu, Zn, Al, Cr, Pb, Sb, and B; xa=0 to 1.2; xb=0 to 2; y=0 to 0.9; and z=2 to 2.3. The values of xa and xb are values before the start of charge and discharge, and increases and decreases during charge and discharge.

Examples of the conductive agent include: graphites, such as natural graphite and artificial graphite; carbon blacks, such as acetylene black, Ketjen black, channel black, furnace black, lamp black, and thermal black; conductive fibers, such as carbon fiber and metallic fiber; metal powders, such as aluminum powder; conductive whiskers, such as zinc oxide whisker and potassium titanate whisker; conductive metal oxides, such as titanium oxide; and organic conductive materials, such as a phenylene derivative. These may be used singly or in combination of two or more. In view of improving the conductivity of the positive electrode active material layer and ensuring the positive electrode capacity, the content of the conductive agent in the positive electrode active material layer is preferably 1 to 30 parts by mass per 100 parts by mass of the positive electrode active material.

Examples of the binder include polyvinylidene fluoride (PVDF), polytetrafluoroethylene, polyethylene, polypropylene, aramid resin, polyamide, polyimide, polyamide-imide, polyacrylonitrile, polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyether, polyether sulfone, hexafluoropolypropylene, styrene-butadiene rubber, and carboxymethyl cellulose. These may be used singly or in combination of two or more. In view of improving the bonding property of the positive electrode active material layer and ensuring the positive electrode capacity, the content of the binder in the positive electrode active material layer is preferably 1 to 15 parts by mass per 100 parts by mass of the positive electrode active material.

The binder may be a polymer electrolyte. The presence of a polymer electrolyte in the positive electrode active material layer facilitates diffusion of lithium ions, allowing for smooth giving and receiving lithium ions between the positive electrode current collector and the positive electrode active material layer. The polymer electrolyte may be used singly as a binder, or in combination with another binder.

The positive electrode current collector may be, for example, a metal film, a metal foil, a non-woven fabric made of a metal fiber. Examples of a metal material constituting the positive electrode current collector include silver, nickel, palladium, gold, platinum, aluminum, aluminum alloy, and stainless steel. One of them may singly constitute the current collector, or a combination of two or more of them may constitute the current collector. The thickness of the positive electrode current collector is, for example, 1 to 30 µm.

Embodiment 2

Next, Embodiment 2 of the present invention is described with reference to the appended drawings.

Figure 16:
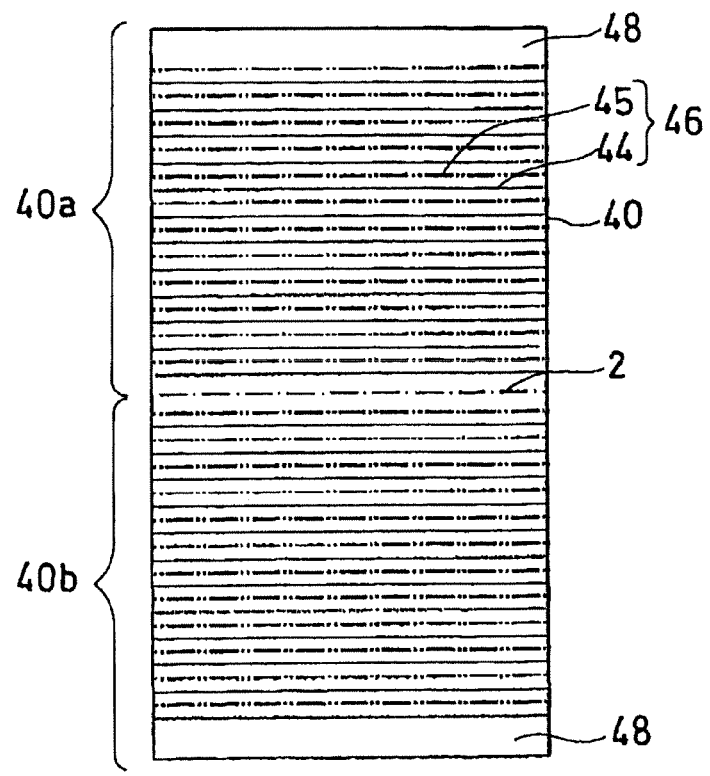
FIG. 16 A plane view of another exemplary laminated film formed in a corrugated shape FIG. 17 An oblique view of the laminated film of FIG. 16 folded into two in which an electrode group is inserted FIG. 18 An oblique view of yet another exemplary die set for forming a bonded portion by fusion bonding FIG. 19 A partial cross-sectional view illustrating the case where the bonding margins formed in a corrugated shape of the laminated film of FIG. 17 are fusion bonded with the die set of FIG. 18.

FIG. 16 is a plane view of a laminated film used in the production method of a flexible battery, according to Embodiment 2 of the present invention.

As illustrated in FIG. 16, in this embodiment, both end areas of the rectangular laminated film 40 in its longitudinal direction, that is, areas corresponding to the parallel section 3b of the bonded portion 3 (the bonding margins 47) are not formed in the corrugated shape and are formed as flat areas 48. The other area of the laminated film 40 is formed in the corrugated shape 46 including the ridge and valley lines 44 and 45, as in Embodiment 1. In the middle of the laminated film 40 in its longitudinal direction, the fold line 2 parallel to the ridge and valley lines 44 and 45 is formed at such a position that the corrugated shape 46 in one of the bonding margins 47 becomes in phase with that of the other, as in Embodiment 1.

Figure 17:
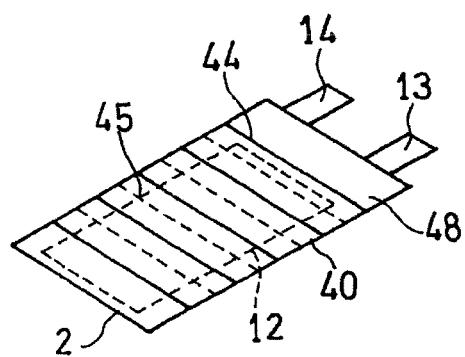

In Embodiment 2 also, similarly to in Embodiment 1, the laminated film 40 may be formed into the corrugated shape 46 and then folded into two along the fold line 2 (the first method), or alternatively, the laminated film 40 may be folded into two along the fold line 2 and then formed into the corrugated shape 46 (the second method). Thereafter, as illustrated in FIG. 17, similarly to in Embodiment 1, the electrode group 12 is inserted into the two-folded laminated film 40.

Figure 18:
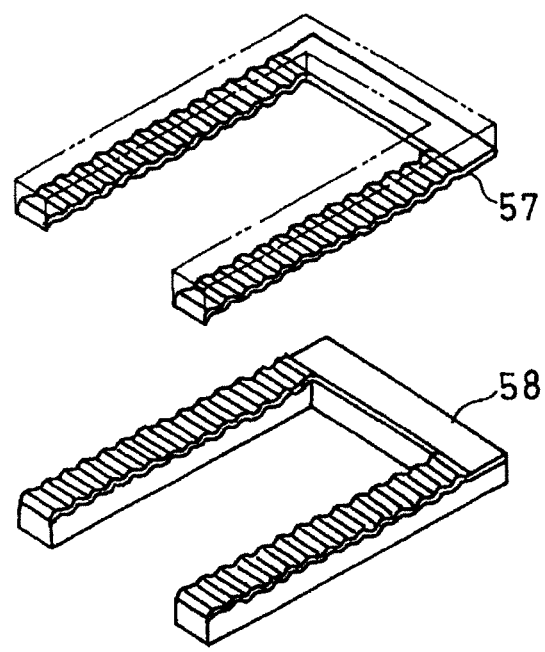
Figure 19:
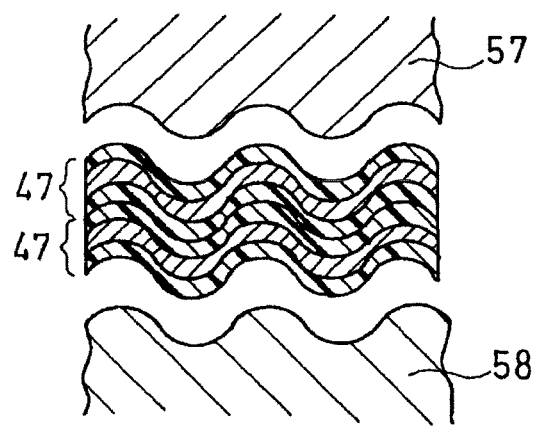

Subsequently, the bonded portion 3 is formed using a die set including upper and lower dies 57 and 58 for forming a bonded portion by fusion bonding, as illustrated in FIG. 18. Of the opposing surfaces of the upper and lower dies 57 and 58, portions corresponding to the parallel section 3b are flat, and portions corresponding to the perpendicular sections 3a are corrugated. At this time, as illustrated in FIG. 19, portions of the bonding margins 47 corresponding to the perpendicular sections 3a are placed between the corrugated surfaces opposing to each other of the upper and lower dies 57 and 58, to be in phase with the corrugations of the dies. On the other hand, portions of the bonding margins 47 (the flat areas 48) corresponding to the parallel section 3b are pressed between the flat portions of the opposing surfaces of the dies, and fusion bonded to each other. In such a manner, the bonded portion 3 in which the perpendicular sections 3a are in the corrugated shape, and the parallel section 3b is flat is formed.

Embodiment 3

Next, Embodiment 3 of the present invention is described with reference to the appended drawings.

Figure 20:
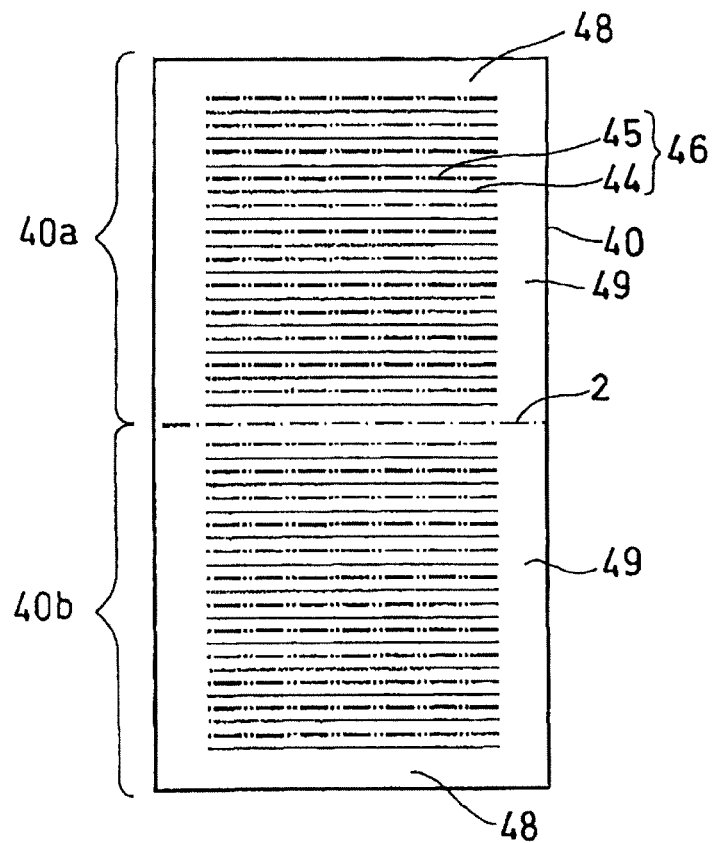
FIG. 20 A plane view of still another exemplary laminated film formed in a corrugated shape FIG. 21 An oblique view of the laminated film of FIG. 20 folded into two in which an electrode group is inserted FIG. 22 A partial cross-sectional view illustrating the case where the bonding margins formed in a corrugated shape of the laminated film of FIG. 21 are fusion bonded with the die set of FIG. 14

FIG. 20 is a plane view of a schematic configuration of a laminated film used in the production method of a flexible battery, according to one embodiment of the present invention.

As illustrated in FIG. 20, in the laminated film 40 of this embodiment also, both end areas of the rectangular laminated film 40 in its longitudinal direction are not formed in the corrugated shape. Specifically, of the two bonding margins 47, portions corresponding to the parallel section 3b of the bonded portion 3 are not formed in the corrugated shape, and formed as the flat areas 48. In this embodiment, however, of the two bonding margins 47, areas corresponding to the perpendicular sections 3a are also not formed in the corrugated shape, and formed as flat areas 49. Only areas corresponding to the two facing portions 43 of the laminated film 40 are formed in the corrugated shape 46 including ridge and valley lines 44 and 45. In the middle of the laminated film 40 in its longitudinal direction, the fold line 2 parallel to the ridge and valley lines 44 and 45 is formed.

Figure 21:
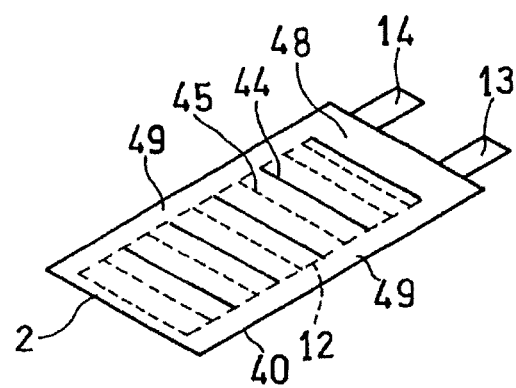
Figure 22:
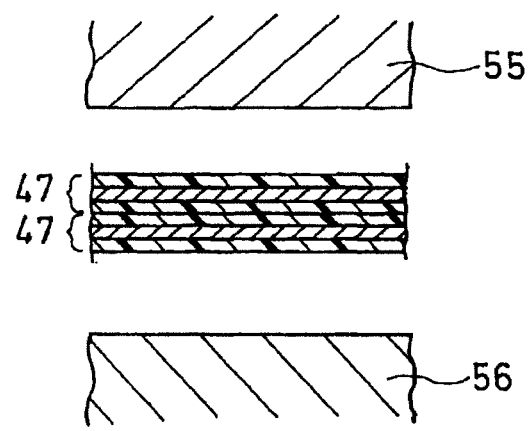

In Embodiment 3 also, similarly to in Embodiment 1, the laminated film 40 may be formed in the corrugated shape 46 and then folded into two along the fold line 2 (the first method), or alternatively, the laminated film 40 may be folded into two along the fold line 2 and then formed in the corrugated shape 46 (the second method). Thereafter, similarly to in Embodiment 1, as illustrated in FIG. 21, the electrode group 12 is inserted into the two-folded laminated film 40.

Subsequently, the bonded portion 3 is formed using the die set including the upper and lower dies 55 and 56 for forming a bonded portion by fusion bonding, the opposing surfaces of which are flat, as illustrated in FIG. 14. At this time, the flat areas 48 and 49 of the bonding margins 47 of the laminated film 40 are pressed between the flat surfaces of the upper and lower dies 55 and 56, to be fusion bonded to each other. In such a manner, the bonded portion 3 in which the perpendicular sections 3a and the parallel section 3b are not formed in the corrugated shape is obtained.

Examples of the present invention are described below. It should be noted, however, the present invention is not limited to these Examples.

Example 1

A flexible battery as illustrated in FIG. 1 in which the perpendicular sections and parallel section of the bonded portion are in the corrugated shape was produced in the following procedures. The procedures described in (1) to (5) below were performed in a dry air atmosphere with a dew point of −30° C.

(1) Production of Negative Electrode

A lithium metal foil (31 mm×31 mm, thickness: 20 μm) was prepared as a negative electrode active material layer. It was press-fitted at a linear pressure of 100 N/cm onto one surface (surface roughness: 2.6 μm) of a negative electrode current collector made of a 31×31 mm copper foil (thickness: 25 μm) having a 12×5 mm tab, to give a negative electrode. Thereafter, a 3-mm-wide and 20-mm-long negative electrode lead made of copper was ultrasonically welded to the tab.

(2) Production of Positive Electrode

Electrolytic manganese dioxide having been heated at 350° C. serving as a positive electrode active material, acetylene black serving as a conductive agent, an N-methyl-2-pyrrolidone (NMP) solution containing polyvinylidene fluoride (PVDF) serving as a binder (product No.: #8500, available from Kureha Corporation) were mixed such that the mass ratio among manganese dioxide, acetylene black, and PVDF was 100:5:5. To the resultant mixture, an appropriate amount of NMP was added, to give a paste of positive electrode material mixture.

The positive electrode material mixture was applied onto one surface of an aluminum foil (thickness: 15 μm) serving as a positive electrode current collector, and dried at 85° C. for 10 min, to form a positive electrode active material layer on the positive electrode current collector. The current collector with the active material thereon was rolled at a linear pressure of 12,000 N/cm with a roll pressing machine. A positive electrode was thus obtained.

The positive electrode was cut in a 29×29 mm square having a 12-mm-wide and 5-mm-long tab. The cut positive electrode was dried at 120° C. for 2 hours under reduced pressure of $3 \times 10^{-6}$ atm. Thereafter, a 5-mm-wide and 20-mm-long positive electrode lead made of aluminum was ultrasonically welded to the tab of the positive electrode.

(3) Impregnation Gel Polymer Electrolyte into Separator

Lithium perchlorate ($LiClO_4$) serving as an electrolyte salt was dissolved at a concentration of 1 mol/kg in a non-aqueous solvent prepared by mixing propylene carbonate (PC) and dimethoxyethane (DME) in a ratio of 6:4 (mass ratio), to give a liquid electrolyte.

A copolymer of hexafluoropropylene and polyvinylidene fluoride (hexafluoropropylene content: 7%) was used as a matrix polymer. The matrix polymer and the liquid electrolyte were mixed in a ratio of 1:10 (mass ratio), and the mixture was dissolved in dimethyl carbonate (DMC), to prepare a solution of gel polymer electrolyte.

The obtained solution was applied uniformly onto both surfaces of a 9-μm-thick separator made of porous polyethylene and on the positive electrode active material layer of the positive electrode, and then the solvent (DMC) was volatilized, to impregnate the gel polymer electrolyte into the positive electrode and separator.

(4) Formation of Electrode Group

The negative electrode and the positive electrode impregnated with the non-aqueous electrolyte layer in a gel state were stacked with the separator (the electrolyte layer) impregnated with the gel polymer electrolyte interposed therebetween, such that the positive electrode active material layer faced the negative electrode active material layer. The resultant stack was hot pressed at 90° C. under 0.5 MPa for 1 min, to give an electrode group.

(5) Production of Housing

A laminated film (thickness: 110 μm) having a size of 42×92 mm and comprising an aluminum foil serving as a barrier layer, a polypropylene layer serving as a seal layer (a resin layer on the inside of the housing), and a nylon layer serving as a protective layer (a resin layer on the outside of the housing) was prepared. A die set for forming corrugations (pitch between ridge lines: 5 mm) as illustrated in FIG. 7 including upper and lower dies 51 and 52 was prepared. The laminated film was compressed using the die set, to form a laminated film as illustrated in FIG. 8 in which almost all area thereof was formed in the corrugated shape.

Next, the laminated film was folded into two along a fold line parallel to the ridge and valley lines, such that the protective layer was on the outside of the housing, and the seal layer was on the inside of the housing (the first method). At this time, the fold line was set at such a position that the corrugated shapes of two portions of the laminated film across the fold line became in phase with each other.

Subsequently, the electrode group was inserted into the film material folded into two. At this time, a part of the positive electrode lead and a part of the negative electrode lead were extended outwardly from the end portion opposite to the fold line. As illustrated in FIG. 9, the electrode group was disposed such that, of the sides around the facing portions facing the electrode group of the laminated film, three sides except the side including the fold line were left as bonding margins.

Thereafter, the laminated film with the electrode group inserted therein was placed in an atmosphere in which the pressure was adjusted to 660 mmHg. A die set as illustrated in FIG. 10 including upper and lower dies 53 and 54 whose opposing surfaces were corrugated was prepared. The bonding margins were fusion bonded using the die set in the above atmosphere, such that the corrugations of these members were in phase with each other. As a result, a bonded portion having a width of 5 mm was formed around the facing portions. In the manner as described above, a flexible battery (hereinafter "Battery A") having a thickness of 400 μm was produced.

Example 2

A flexible battery (hereinafter "Battery B") having a thickness of 400 μm was produced in the same manner as in Example 1, except that the laminated film was folded into two, and then almost all area of the laminated film was formed in the corrugated shape (the second method).

Example 3

A flexible battery ("Battery C") having a thickness of 400 μm was produced in the same manner as in Example 1, except that the die set for fusion bonding as illustrated in FIG. 14 including the upper and lower dies 55 and 56 whose opposing surfaces were flat was used.

Example 4

As illustrated in FIG. 16, the bonding margins on both ends of the laminated film in the longitudinal direction thereof were not formed in the corrugated shape, while the other area thereof was formed in the corrugated shape. The die set for forming a bonded portion by fusion bonding used here was a die set as illustrated in FIG. 18 including the upper and lower dies 57 and 58 in which portions corresponding to the parallel section of the bonded portion were flat, and portions corresponding to the perpendicular sections of the bonded portion were corrugated. A flexible battery ("Battery D") having a thickness of 400 μm was produced in the same manner as in Example 1, except the above.

Comparative Example 1

Figure 23:
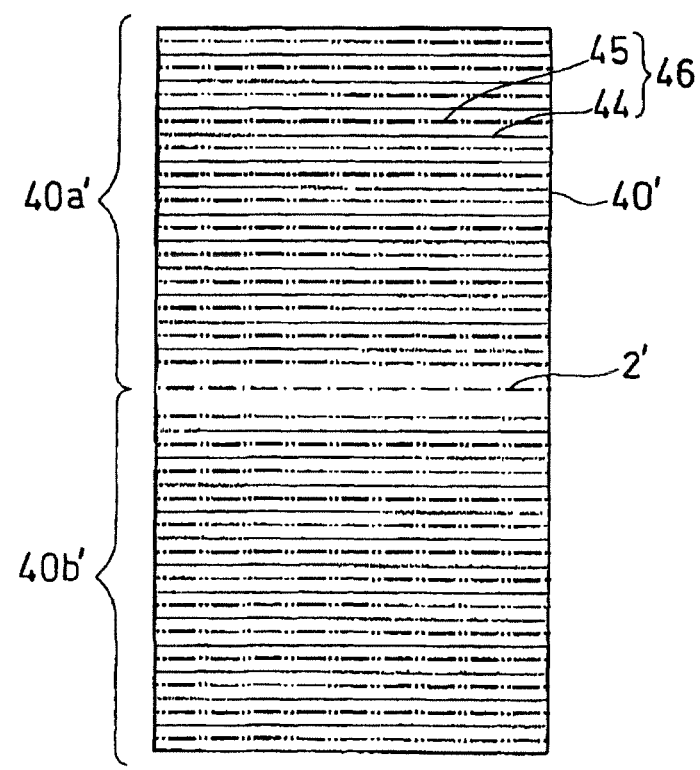
FIG. 23 A plane view of a laminated film formed in a corrugated shape of a comparative example of the present invention FIG. 24 A partial cross-sectional view illustrating the case where the bonding margins formed in a corrugated shape of the laminated film of FIG. 23 are fusion bonded with the die set of FIG. 14

As illustrated in FIG. 23, a laminated film 40' was folded into two along a fold line 2', and then almost all area of the laminated film 40' was formed in the corrugated shape 46 including ridge and valley lines 44 and 45 parallel to the fold line 2'. At this time, it was adjusted such that the corrugated shapes of two portions 40a' and 40b' of the laminated films 40' divided by the fold line 2' as a boundary therebetween were out of phase from each other by 180°. In other words, the laminated film 40' was formed in the corrugated shape such that, when folded along the fold line 2', the ridge lines 44 of the portion 40a' became overlapped with those of the portion 40b', and the valley lines 45 of the portion 40a' became overlapped with those of the portion 40b'.

The bonding margins 47 were fusion bonded, with the corrugated shapes of the bonding margins 47 being out of phase from each other by 180° as illustrated in FIG. 24, using a die set for forming a bonded portion by fusion bonding as illustrated in FIG. 14 including upper and lower dies 55 and 56 whose opposing surfaces were flat. A flexible battery ("Comparative battery 1") having a thickness of 400 μm was produced in the same manner as in Example 1, except the above.

Comparative Example 2

Figure 25:
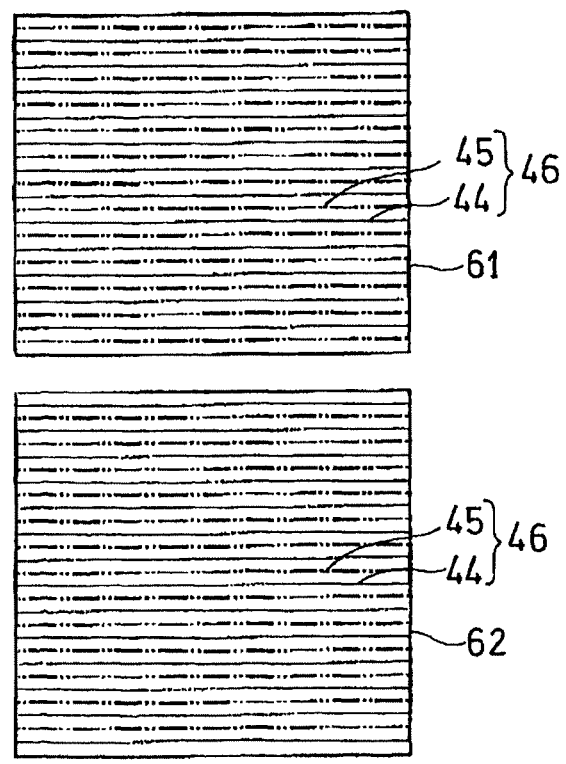
FIG. 25 A plane view of laminated films each formed in a corrugated shape of another comparative example of the present invention FIG. 26 A schematic side view illustrating how the flexibility of a thin battery according to examples of the present invention is evaluated using an evaluation instrument FIG. 27 A schematic top view of FIG. 26

As illustrated in FIG. 25, two laminated films 61 and 62 each having a barrier layer, a seal layer, and a protective layer were prepared. The laminated films 61 and 62 were each formed into the corrugated shape 46 including the ridge and valley lines 44 and 45 running in parallel to each other at equal pitches. The laminated films 61 and 62 were overlapped, with the corrugated shapes 46 being brought into phase with each other, and the electrode group was disposed therebetween in the middle. The portions around the facing portions facing the electrode group (bonding margins) were fusion bonded. At this time, a part of the positive electrode lead and a part of the negative electrode lead were exposed outside as a positive electrode terminal and a negative electrode terminal. A flexible battery ("Comparative battery 2") having a thickness of 400 μm was produced in the same manner as in Example 1, except the above.

[Evaluation]

(a) Evaluation of Flexibility (Three-Point Bending Test)

The flexibility of the thin battery was evaluated by a three-point bending test, using a Tensilon universal tester (RTC-1150A, available from Orientec Co., Ltd.).

Figure 26:
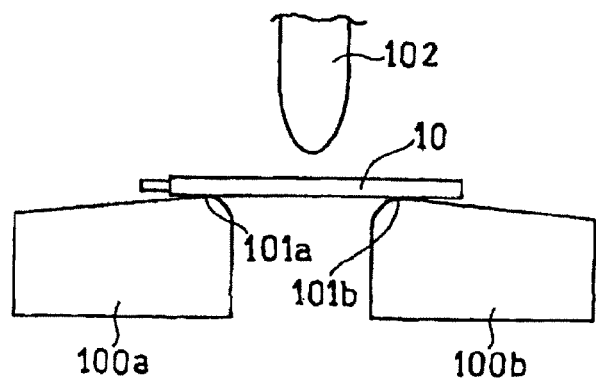
Figure 27:
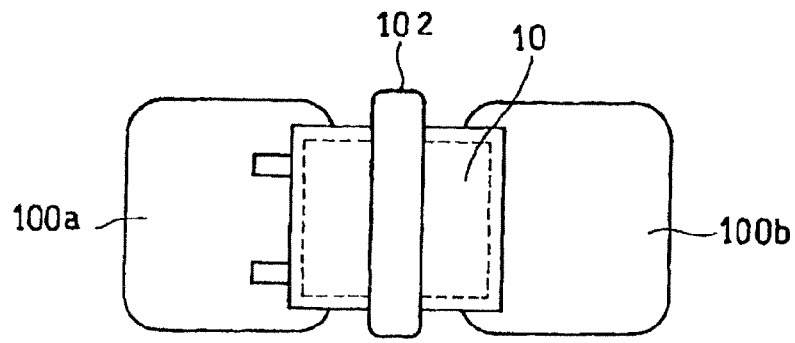

Specifically, as illustrated in FIGS. 26 and 27, two thermally fusion bonded end portions of the thin battery 10 were placed on a pair of symmetrically arranged base blocks 100a and 100b so as to be supported at support points 101a and 101b on the edges of the upper surfaces thereof. A round tip end of a flat indenter 102 was brought from above into line contact with the center of the thin battery 10 supported at the two support points 101a and 101b, to apply pressure to the center portion of the battery 10 with the indenter 102.

The support points 101a and 101b on the base blocks 100a and 100b had a curved surface having a radius of curvature of 2 mm. The distance between the support points was 30 mm, and the tip end of the indenter 102 was rounded with a radius of 5 mm. The load was applied at a rate of 100 mm/min. The maximum load observed is an index to show the flexibility of the thin battery. The smaller the maximum load is, the higher the flexibility is.

(b) Evaluation of Sealing Performance
(High-Temperature and High-Humidity Storage Test)

Each flexible battery was subjected to a high-temperature and high-humidity storage test. Two batteries each from Batteries A to D and Comparative batteries 1 and 2 (hereinafter collectively referred to as "test batteries") were prepared. One of the two batteries was discharged under the conditions that the ambient temperature was 25° C.; the discharge current density was 250 µA/cm$^2$ (current value per unit area of positive electrode); and discharge cut-off-voltage was 1.8 V, to determine the discharge capacity. The determined discharge capacity was taken as a discharge capacity at test-initiation.

The other battery was stored for 100 days in a high-temperature and high-humidity environment (60° C. 90% RH), and the batteries after storage was discharged under the same conditions as above, to determine the discharge capacity at test-ending. The discharge capacity at test-ending was divided by the discharge capacity at test-initiation, to determine a capacity retention rate.

(Bending and Pressing Test)

Figure 28:
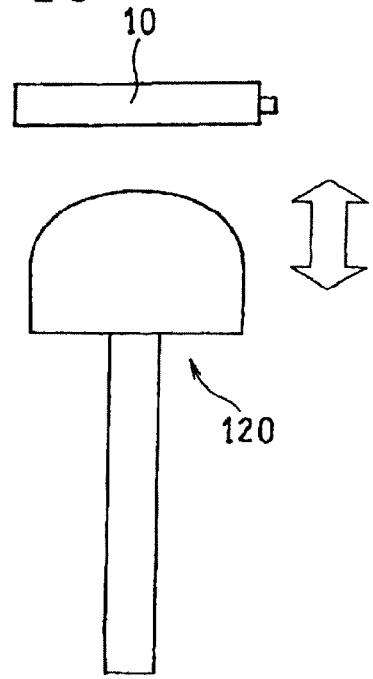
FIG. 28 A schematic side view illustrating how the bending performance of a thin battery according to examples of the present invention is evaluated using an evaluation tool

As illustrated in FIG. 28, a tool 120 with a curved surface having a radius of curvature of 20 mm was forced onto each test battery to allow the test battery to bend along the curved surface of the tool 120, and then the tool 120 was moved away from the test battery to restore it into the original state. This operation was repeated 10,000 times in total. Thereafter, the test battery was pressed with a pressure of 5 MPa, and the number of the test batteries in which leakage of electrolyte was observed was counted. In such a manner, the leakage resistance being a part of the sealing performance was evaluated.

The foregoing results are shown in Table 1.

TABLE 1

| | Flexibility Maximum load observed in three-point bending test (N) | Sealing performance | |
|---|---|---|---|
| | | High-temperature and high-humidity storage test Capacity retention rate (%) | Bending and pressing test Number of leaked batteries (per number of batteries tested) |
| Battery A | 1.8 | 96 | 0/5 |
| Battery B | 1.8 | 96 | 0/5 |
| Battery C | 1.9 | 93 | 0/5 |
| Battery D | 1.8 | 97 | 0/5 |
| Comparative Battery 1 | 2.2 | 68 | 4/5 |
| Comparative Battery 2 | 1.9 | 78 | 2/5 |

As shown in Table 1, Batteries A to D of Examples 1 to 4 had more excellent sealing performance than Comparative Examples 1 and 2. This is presumably because, in Batteries A to D, in fusion bonding the bonding margins, the corrugated shapes in the bonding margins were easily brought in phase with each other, which made it possible to achieve hermetic sealing.

On the other hand, in Comparative battery 1, the corrugated shapes in the bonding margins were out of phase from each other by 180°, and therefore, it was very difficult to obtain hermetic sealing. In Comparative battery 2, although two laminated films were overlapped such that the corrugated shapes were brought into phase with each other, these laminated films were separate films and not one film folded along a fold line. Presumably because of this, the corrugated shapes became out of phase, although very slightly, resulting in inferior sealing performance.

Example 5

A flexible battery ("Battery E") having a thickness of 400 µm was produced in the same manner as in Example 1, except that, in the folded portion, the width of the two perpendicular sections extending perpendicularly to the fold line was set to 1 mm, and the size of the laminated film was set to 38×92 mm.

Example 6

A flexible battery ("Battery F") having a thickness of 400 µm was produced in the same manner as in Example 1, except that, in the folded portion, the width of the parallel section extending in parallel to the fold line on the side opposite to the fold line was set to 10 mm, and the size of the laminated film was set to 56×92 mm.

Example 7

A flexible battery ("Battery G") having a thickness of 400 µm was produced in the same manner as in Example 1, except that, in the folded portion, the width of the two perpendicular sections extending perpendicularly to the fold line was set to 12 mm, and the size of the laminated film was set to 60×92 mm.

Batteries E to G were subjected to the above-described three-point bending test, high-temperature and high-humidity storage test, and bending and pressing test, to evaluate the flexibility and sealing performance of each test battery. In addition, from the volume of the test battery calculated assuming that it was approximately rectangular in shape, the energy density of the test battery was determined. The results are shown in Table 2. The evaluation results of Battery A are also shown in Table 2.

TABLE 2

| | Battery configuration | | Flexibility Maximum load observed in three-point bending test (N) | Sealing performance | | |
|---|---|---|---|---|---|---|
| | Width of bonded portion (mm) | Size of film material (mm) | | High-temperature and high-humidity storage test Capacity retention rate (%) | Bending and pressing test Number of leaked batteries | Energy density (Wh/l) |
| Battery A | 3 | 42 × 92 | 1.8 | 98 | 0/5 | 130 |
| Battery E | 1 | 38 × 92 | 1.8 | 98 | 0/5 | 145 |
| Battery F | 10 | 56 × 92 | 1.9 | 98 | 0/5 | 100 |
| Battery G | 12 | 60 × 92 | 1.9 | 99 | 0/5 | 89 |

As shown in Table 2, the larger the width of the bonded portion was, the more excellent the sealing performance was. Batteries E to G exhibited a high capacity retention rate even after a long-term storage in a high-temperature and high-humidity environment. However, as observed in Battery G of Example 7, an excessively large width of the bonded portion led to a low energy density of the battery. This is because the proportion of the site incapable of contributing to the battery reaction was large. Therefore, in view of achieving good balance between the energy density and the sealing reliability of the battery, the width of the bonded portions is preferably within 10 mm.

Example 8

A flexible battery ("Battery H") having a thickness of 400 μm was produced in the same manner as in Example 1, except that a dry polymer electrolyte was used as the electrolyte layer.

An electrode group including a dry polymer electrolyte as the electrolyte layer was produced in the following manner.

In 100 g of acetonitrile, 10 g of polyethylene oxide having a viscosity average molecular weight of 100,000 (available from Sigma-Aldrich Co. LLC. U.S.), and 10 g of dimethoxyethane (DME) were dissolved, to give an acetonitrile solution of polyethylene oxide. To the solution, $LiN(CF_3SO_2)_2$ was added such that the molar ratio [Li]/[EO] of the lithium ion concentration [Li] to the ether oxygen concentration [EO] in the ethylene oxide moiety in the polymer became 0.05. An acetonitrile solution of dry polymer electrolyte was thus obtained. The acetonitrile solution of dry polymer electrolyte thus obtained was casted onto the lithium metal foil and the positive electrode layer. This was followed by vacuum drying at room temperature for 48 hours to remove the acetonitrile and DME being the solvent components, so that an electrolyte layer was formed on the positive electrode active material layer and the negative electrode active material layer. The negative electrode, the positive electrode, and the electrolyte layer were stacked such that the positive electrode active material layer faced the negative electrode active material layer, with the electrolyte layer comprising dry polymer interposed therebetween. The resultant stack was hot pressed at 90° C. under 0.5 MPa for 1 min, to give an electrode group.

Example 9

A flexible battery ("Battery I") having a thickness of 400 μm was produced in the same manner as in Example 1, except that a liquid electrolyte was used as the electrolyte layer.

Specifically, the positive electrode and the separator, both without being impregnated with the gel electrolyte layer, were stacked together with the negative electrode, into an electrode group. Before forming the bonded portion, 500 μL of non-aqueous electrolyte was injected into the housing. The non-aqueous electrolyte was a non-aqueous electrolyte prepared by dissolving $LiClO_4$ at a concentration of 1 mol/L in a non-aqueous solvent. The non-aqueous solvent was a mixed solvent of propylene carbonate and dimethoxyethane (1:1 volume ratio).

Batteries H and I were subjected to the above-described three-point bending test, high-temperature and high-humidity storage test, and bending and pressing test, to evaluate the flexibility and sealing performance of each test battery. The results are shown in Table 3. The evaluation results of Battery A are also shown in Table 3.

TABLE 3

| | | | Sealing performance | |
|---|---|---|---|---|
| | Battery configuration Electrolyte | Flexibility Maximum load observed in three-point bending test (N) | High-temperature and high-humidity storage test Capacity retention rate (%) | Bending and pressing test Number of leaked batteries |
| Battery A | Gel polymer electrolyte | 1.8 | 96 | 0/5 |
| Battery H | Dry polymer electrolyte | 1.8 | 96 | 0/5 |
| Battery I | Liquid electrolyte | 1.7 | 94 | 1/5 |

As shown in Table 3, Battery A including a gel polymer electrolyte, Battery H including a dry polymer electrolyte, and Battery I including a liquid electrolyte were all excellent in the flexibility and sealing performance. Among them, Batteries A and H including a dry polymer electrolyte or a gel polymer electrolyte were more excellent in sealing reliability. Presumably because of the viscoelasticity of the electrolyte layer, like that of dry polymer electrolyte and gel polymer electrolyte, the sealing reliability was improved. On the other hand, in Battery I including a liquid electrolyte, the sealing performance evaluated by the bending and pressing test was not favorable, whereas the sealing performance evaluated by the high-temperature and high-humidity test was favorable. In this respect, the sealing reliability was high.

Example 10

A flexible battery ("Battery J") having a thickness of 400 μm was produced in the same manner as in Example 1, except that a Li—Al alloy (Al: 3 mass %) was used as the negative electrode active material layer.

Battery J was subjected to the above-described three-point bending test, high-temperature and high-humidity storage test, and bending and pressing test, to evaluate the flexibility and sealing performance of each test battery. The results are shown in Table 4. The evaluation results of Battery A are also shown in Table 4.

TABLE 4

| | | | | Sealing performance | |
|---|---|---|---|---|---|
| | Battery configuration | | Flexibility Maximum load observed in three-point bending test (N) | High-temperature and high-humidity storage test Capacity retention rate (%) | Bending and pressing test Number of leaked batteries |
| | Negative electrode active material | Positive electrode active material | | | |
| Battery A | Li | $MnO_2$ | 1.8 | 96 | 0/5 |
| Battery J | Li-Al alloy | $MnO_2$ | 1.8 | 96 | 0/5 |

As shown in Table 4, Battery J, like Battery A, had excellent flexibility and leakage resistance.

Example 11

A laminated film as illustrated in FIG. 20, in which all the peripheral portions (the bonding margins) were flat, and only the facing portions to face the electrode group were formed in the corrugated shape, was prepared by the first method. The bonding margins were bonded using the die set as illustrated in FIG. 14 including the upper and lower dies 55 and 56 whose opposing surfaces were flat. A flexible battery ("Battery K") having a thickness of 400 μm was produced in the same manner as in Example 1, except the above.

Example 12

A flexible battery ("Battery L") having a thickness of 400 μm was produced in the same manner as in Example 2 2, except that the laminated film was folded into two, and then only the facing portions of the laminated film were formed into the corrugated shape (the second method).

Batteries K and L were subjected to the above-described three-point bending test, high-temperature and high-humidity storage test, and bending and pressing test, to evaluate the flexibility and sealing performance of each test battery. The results are shown in Table 5. The evaluation results of Battery A are also shown in Table 5.

TABLE 5

| | Flexibility Maximum load observed in three-point bending test (N) | Sealing performance | |
|---|---|---|---|
| | | High-temperature and high-humidity storage test Capacity retention rate (%) | Bending and pressing test Number of leaked batteries |
| Battery A | 1.8 | 96 | 0/5 |
| Battery K | 1.9 | 96 | 0/5 |
| Battery L | 1.9 | 96 | 0/5 |

As shown in Table 5, Batteries K and L, like Battery A, had excellent flexibility and sealing performance. This is presumably because the film material was easily positioned when sealing, and a uniformly fusion bonded sealed portion was obtained, which made it possible to achieve hermetic sealing.

INDUSTRIAL APPLICABILITY

By applying the present invention to a device which operates while the flexible battery is in contact with a living body, and thus is required to have high flexibility, the discomfort caused by the rigidity of the battery during the use of the device can be reduced. This allows for a long term use of the device without making the user feel discomfort. Furthermore, the flexible battery according to the present invention has excellent sealing reliability, and thus can improve the reliability of the device to which it is applied.

[Reference Signs List]

| | |
|---|---|
| 2 | Fold line |
| 3 | Bonded portion |
| 3a | Perpendicular section |
| 3b | Parallel section |
| 10 | Battery |
| 11 | Housing |
| 12 | Electrode group |
| 20 | Negative electrode |
| 30 | Positive electrode |
| 40 | Laminated film |
| 43 | Facing portion |
| 44 | Ridge line |

[Reference Signs List]

| | |
|---|---|
| 45 | Valley line |
| 46 | Corrugated shape |
| 47 | Bonding margin |

The invention claimed is:

1. A flexible battery comprising a sheet-like electrode group, an electrolyte, and a housing with flexibility enclosing the electrode group and the electrolyte, wherein
the housing includes a film material folded into two in which the electrode group is inserted;
the film material has two facing portions respectively facing two principal surfaces of the electrode group, a fold line which is between the two facing portions and along which the film material is folded, and two bonding margins respectively set around the two facing portions;
the two bonding margins are bonded to each other into a bonded portion;
at least the two facing portions of the film material are formed in a corrugated shape having a plurality of ridge lines and a plurality of valley lines arranged in parallel to each other, and the ridge lines in one of the two facing portions are overlapped with the valley lines in the other of the two facing portions; and
the fold line is parallel to the ridge lines and the valley lines.

2. The flexible battery according to claim 1, wherein
the bonded portion has a plurality of perpendicular sections extending perpendicularly to the fold line, and a parallel section extending in parallel to the fold line on a side opposite to the fold line;
the perpendicular sections are formed in the corrugated shape, and the two facing portions and the perpendicular sections form continuous corrugations; and
the ridge lines in a portion of one of the two bonding margins corresponding to the perpendicular sections are overlapped with the valley lines in a portion of the other of the two bonding margins corresponding to the perpendicular sections.

3. The flexible battery according to claim 1, wherein
the bonded portion has a plurality of perpendicular sections extending perpendicularly to the fold line, and a parallel section extending in parallel to the fold line on a side opposite to the fold line; and
the perpendicular sections are flat without being formed in the corrugated shape.

4. The flexible battery according to claim 2, wherein
the parallel section is formed in the corrugated shape;
the ridge lines in a portion of one of the two bonding margins corresponding to the parallel sections are overlapped with the valley lines in a portion of the other of the two bonding margins corresponding to the parallel sections.

5. The flexible battery according to claim 2, wherein
the parallel section is flat without being formed in the corrugated shape.

6. The flexible battery according to claim 1, wherein the bonded portion has a width of 1 to 10 mm.

7. The flexible battery according to claim 1, wherein the electrolyte includes a polymer electrolyte.

8. The flexible battery according to claim 1, wherein the film material is a laminated film having a metal layer and a resin layer.

9. A method for producing a flexible battery comprising a sheet-like electrode group, an electrolyte, and a housing with flexibility enclosing the electrode group and the electrolyte, the method comprising the steps of:

forming a film material into a corrugated shape having a plurality of ridge lines and a plurality of valley lines arranged in parallel to each other, and then folding the film material into two along a fold line parallel to the ridge lines and the valley lines, such that the ridge lines in one of portions to be opposed to each other overlap the valley lines in the other of the portions, or alternatively, folding a film material into two along the fold line, and then forming the film material into a corrugated shape having a plurality of ridge lines and a plurality of valley lines arranged in parallel to each other, such that the ridge lines in one of portions to be opposed to each other overlap the valley lines in the other of the portions;

inserting the electrode group into the film material folded into two along the fold line; and bonding two bonding margins to each other, the bonding margins being set on sides around two facing portions respectively facing two principal surfaces of the electrode group, except a side including the fold line.

10. The method for producing a flexible battery according to claim 9, wherein in forming the film material into the corrugated shape, portions of the film material corresponding to the two bonding margins are made flat without being formed in the corrugated shape.

11. The method for producing a flexible battery according to claim 9, wherein in forming the film material into the corrugated shape, portions of the film material corresponding to the two bonding margins are formed in the corrugated shape.

* * * * *